United States Patent

[11] 3,632,371

[72] Inventor Bohuslav E. Mikulka
  Richmond, Va.
[21] Appl. No. 31,531
[22] Filed Apr. 24, 1970
[45] Patented Jan. 4, 1972
[73] Assignee Evans Products Company
  Portland, Oreg.

[54] METHOD OF MAKING MULTILAYER MAT OF PARTICULATE MATERIAL
3 Claims, 1 Drawing Fig.

[52] U.S. Cl. ................................................. 117/19,
  117/29, 118/411, 264/37, 264/113
[51] Int. Cl. ..................................................... B44c 1/08,
  B44d 1/094
[50] Field of Search ............................................. 117/19, 29;
  118/314, 411, 412; 264/37, 113

[56] References Cited
UNITED STATES PATENTS

| | | | |
|---|---|---|---|
| 1,201,187 | 10/1916 | Jaek | 117/19 |
| 1,569,056 | 1/1926 | Welch | 117/19 X |
| 1,929,200 | 10/1933 | Lipsius | 117/19 UX |
| 2,193,263 | 3/1940 | Avery | 117/19 |
| 2,268,890 | 1/1942 | Mortensen, Jr. | 117/19 UX |
| 2,349,153 | 5/1944 | Ferrante | 117/29 |
| 2,743,758 | 5/1956 | Uschmann | 264/113 X |
| 2,900,270 | 8/1959 | Klein | 118/314 X |
| 3,435,106 | 3/1969 | Hager | 264/113 |

FOREIGN PATENTS 606,421 10/1960 Canada ........................ 264/37

Primary Examiner—Alfred L. Leavitt
Assistant Examiner—J. R. Batten, Jr.
Attorney—Buckhorn, Blore, Klarquist and Sparkman ABSTRACT: A method of making a multilayer mat or board comprises splitting an initial supply of particulate material into two parts and supplying one of such parts to a first forming machine and the other of such parts to a second forming machine positioned downstream of the first forming machine. The first forming machine spreads a first amount of the material on a moving conveyor at a rate in excess of that necessary to form a first layer on the conveyor. The second forming machine spreads a second amount of the material downstream of the first forming machine at a rate in excess of that necessary to form a second layer above the first layer. The excess material spread by the forming machines is removed by first and second scalpers positioned downstream of and adjacent each of said forming machines to insure uniform thickness of the layers. The invention is characterized by the fact that the excess material removed by the first scalper is returned to the supply for the second forming machine, and the excess material removed by the second scalper is returned to the supply for the first forming machine. In this manner the total supply of material to each of the forming machines remains substantially constant notwithstanding variations in the amounts of particulate material supplied to or fed from each of the machines.

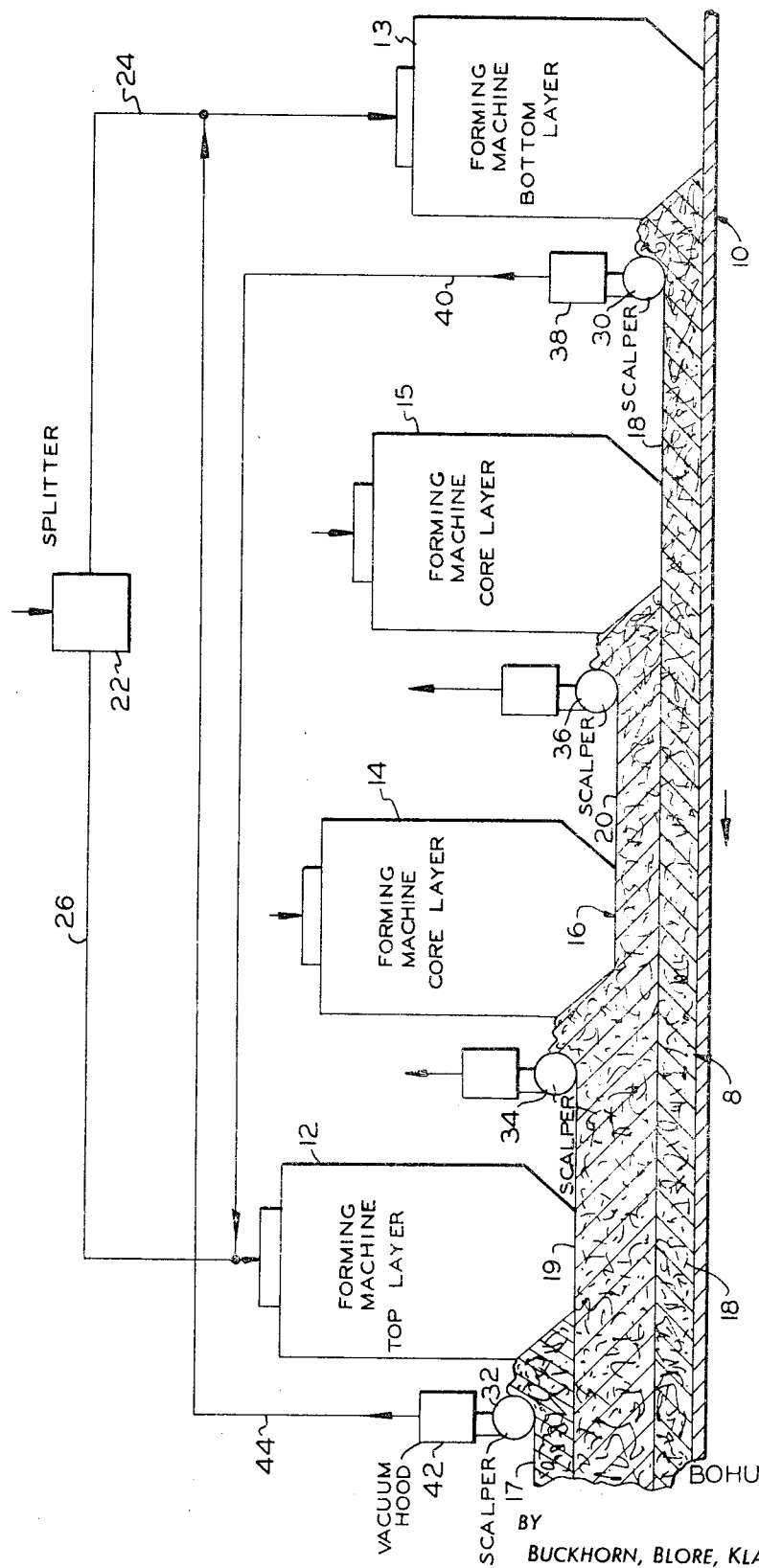

METHOD OF MAKING MULTILAYER MAT OF PARTICULATE MATERIAL

BACKGROUND OF THE INVENTION

This invention relates to the manufacture of multilayer mats or boards, and more particularly, to the manufacture of such mats or boards having a core section comprising one or more layers disposed between top and bottom layers of identical thickness and weight.

Multilayer mats or boards are generally manufactured in a continuous process wherein the boards are formed on a continuously moving conveyor by laying down a face layer of particulate material, thence the core material and finally, the opposite face layer. It is desirable to have the two face layers be of identical weight and thickness so as to minimize warping. The material for such face layers is usually fed to separate forming machines from a common source through a splitter in the feed system. It is important to have identical feed rates to the machines depositing the opposite face layers and this has required that the particulate material be evenly split in the feeding apparatus. Obtaining such an even split has been a serious problem heretofore. This invention is intended to overcome this problem.

It is thus the primary object of the present invention to provide a method of making multilayer structures of particulate material having top and bottom layers of identical weight and thickness.

It is a further object of the present invention to provide a method of making such structures wherein the supply of material to the forming machines which deposit the top and bottom layers is maintained substantially constant.

It is a still further object of the present invention to provide such a method wherein substantially constant supplies of particulate material are provided to the forming machines for the top and bottom layers notwithstanding unequal adjustment of the splitting means in the initial feeding system.

It is a still further object of the present invention to provide a method such that volumetric control of the supply of material to the forming machines remains substantially perfect even over extended periods of time.

SUMMARY OF THE INVENTION

In the manufacture of multilayer mats or boards from deposited particulate material, or mats or boards having a multilayer core, especially with outside layers of a different material than the core layers, an initial supply of material for the outside layers is initially divided into two parts in the feed system. One of such parts is supplied to a first depositing means and the other of such parts is supplied to a second depositing means positioned downstream of the first means. Such first depositing means deposits a first amount of the particulate material on a moving means at a rate in excess of that necessary to form a first layer on the moving means. The second depositing means deposits a second amount of the material downstream of the first depositing means at a rate in excess of that necessary to form a second layer of such material above the first layer. The excess material deposited by the first and second depositing means is then removed by first and second removing means positioned downstream of and adjacent the first and second depositing means, respectively.

The invention contemplates that the excess material removed by the first removing means be returned to the supply for the second depositing means, and the excess material removed by the second removing means be returned to the supply for the first depositing means. In this manner, the total supply of particulate matter to each of the depositing means remains substantially constant, notwithstanding variations in the amounts of particulate material supplied to each of such depositing means caused by unequal division of the initial supply thereto.

BRIEF DESCRIPTION OF THE DRAWING

The FIGURE is a schematic illustration showing the general arrangement of a forming line in the process of forming a multilayer mat from particulate material on a moving conveyor.

DESCRIPTION OF THE PREFERRED EMBODIMENT

Referring to the drawing a forming line for forming a multilayer cellulose mat or board 8 is illustrated in a typical arrangement. A conveyor 10 moves to the left underneath a series of four forming machines 12, 13, 14 and 15 which deposit the particulate material 16 required to form the top, bottom and core layers 17, 18, 19 and 20, respectively.

In accordance with the preferred practice it is highly desirable that the top layer 17 and the bottom layer 18 be of identical weight and thickness so as to minimize warping of the ultimate product. Thus the material for layers 17 and 18 is fed to the respective forming machines 12 and 13 through a splitter 22 in the feed system.

The splitter 22 divides the material initially into two parts. One of such parts is fed through a line 24 into the bottom layer forming machine 13 which deposits the same directly onto the belt 10. The other of such parts is fed through a line 26 to the top layer forming machine 12 which is positioned downstream of the machine 13. Other particulate materials are fed to the core layer forming machines 14 and 15 for the depositing of the intermediate or core layers 19 and 20, respectively. These core layer forming machines do not otherwise enter into the invention.

In the formation of mats and boards from particulate material, it is customary for each forming machine to deposit the material at a rate in excess of that necessary to form the respective layer. The excess material is then removed by a shaveoff or scalper positioned downstream of and adjacent each forming machine to insure an accurate and uniform thickness of the respective layer. Thus, the material deposited for the bottom layer 18 by the forming machine 13 is removed or shaved off by a scalper 30 positioned downstream of and immediately adjacent the machine 13. Similarly, a scalper 32 removes the excess material deposited by the top layer forming machine 12. Additional scalpers 34 and 36 remove the excess core layer materials deposited by the forming machines 14 and 15, respectively.

In accordance with the invention, the excess material removed by the scalper 30 is removed through a vacuum hood 38 and returned through a line 40 to the supply for the top layer forming machine 12. Similarly, the excess material shaved off by the top layer scalper 32 is removed through a vacuum hood 42 and returned through a line 44 to the supply for the bottom layer forming machine 13.

Such crossover feedback of excess material removed by the respective scalpers for the top and bottom layers results in the total supply of particulate material for each of the forming machines 12 and 13 remaining substantially constant notwithstanding variations in the amounts of materials initially supplied to each of such machines caused by unequal splitting by the splitter 22 or by variations in the deposit rate. This will be readily seen by considering the following analysis.

If we let $a$ represent the total flow of material necessary for the formation of the top and bottom layers 17 and 18, respectively, such desirably should be divided by the splitter 22 into two precisely equal flows $a/2$. Since the function of the scalpers 30 and 32 is to insure an accurate and uniform thickness of the deposited layers by shaving them off to the desired height, it is customary to deposit an excess amount of material, and this excess can be represented by $c$ which generally varies between 10 and 30 percent of the required flows $a/2$.

If the division of the initial flows by the splitter 22 were perfect, the material removed by the vacuum hoods 38 and 42 would each be equal to the constant value $c$. Since however, no splitting device can function with 100 percent accuracy, the resulting flow rates through lines 24 and 26 are not precisely equal and they may be represented as

| | |
|---|---|
| Flow to bottom layer | $= a/2 + b$ |
| Flow to top layer | $= a/2 - b$ | where $b$ is the deviation between the theoretically equally split flows $a/2$ and that which actually passes through each of the lines 24 and 26.

Since the flow through line 26 to the top layer forming machine 12 is $(a/2-b)$, the amount removed by scalper 32 and recirculated through line 44 to the bottom layer forming machine 13 is

| | |
|---|---|
| Material removed by top layer scalper 32 | $= c - b$ |

Thus,

| | |
|---|---|
| Total feed rate into bottom layer forming machine 13 | = Feed rate from splitter + recirculation from scalper 32 |
| Total feed rate into forming machine 13 | $= (a/2+b)+(c-b)$ |
| Total feed rate into forming machine 13 | $= a/2 + c$ |

Similarly,

| | |
|---|---|
| Total feed rate into | $= (a/2-b)+(c+b)$ |
| Total feed rate into forming machine 12 | $= a/2 + c$ |
| Removed by each scalper | $= -c$ |
| Rate of deposit into each of top and bottom layers | $= a/2$ |

It is thus seen that the total supply of particulate material to each of the top and bottom layer forming machines 12 and 13 remains substantially constant notwithstanding variations in the amounts of material initially supplied to each caused by unequal splitting in the initial supply. Even with a relatively large difference in the two initial flows, as would be obtained with a relatively poor adjustment of the splitter 22, the volumetric control of the amount deposited remains perfect over extended periods of time.

Having illustrated and described certain preferred embodiments of the invention, it should be apparent that the invention permits of modification in arrangement and detail. I claim all such arrangements as come within the scope and purview of the appended claims.

I claim:

1. In a method of making a multilayer continuous structure from deposited particulate material comprising
   dividing an initial supply of particulate material into two parts;
   supplying one of said parts to a first depositing means and the other of said parts to a second depositing means positioned downstream of said first depositing means;
   said first depositing means depositing a first amount of said material on a moving means at a rate in excess of that necessary to form a first layer on said moving means;
   said second depositing means depositing a second amount of said material downstream of said first depositing means at a rate in excess of that necessary to form a second layer of said material above said first layer; and
   removing the excess material deposited by said first and second depositing means by first and second removing means positioned downstream of and adjacent said first and second depositing means, respectively;
   the improvement comprising:
      returning said excess material removed by said first removing means to the supply for said second depositing means and said excess material removed by said second removing means to the supply for said first depositing means,
      wherein the total supply of particulate material to each of said depositing means remains substantially constant, notwithstanding variations in the amounts of particulate material supplied to each of said depositing means caused by said dividing of said initial supply being unequal.

2. In a method of making a multilayer mat of particulate material comprising
   splitting an initial supply of particulate material into two parts;
   supplying one of said parts to a first forming machine and the other of said parts to a second forming machine positioned downstream of said first forming machine;
   said first forming machine spreading a first amount of said material on a moving conveyor at a rate in excess of that necessary to form a first layer on said conveyor;
   said second forming machine spreading a second amount of said material downstream of said first forming machine at a rate in excess of that necessary to form a second layer of material above said first layer; and
   removing the excess material spread by said first and second forming machines by first and second scalping means positioned downstream of and adjacent said first and second forming machines, respectively, to insure uniform thickness of said first and second layers;
   the improvement comprising:
      returning said excess material removed by said first scalping means to the supply for said second forming machine and said excess material removed by said second scalping means to the supply for said first forming machine,
      wherein the total supply of material to each of said forming machines remains substantially constant notwithstanding variations in the amounts of material supplied to each of said forming machines caused by unequal splitting of the initial supply thereto.

3. In a method of making a three-layer cellulose board having a core layer disposed between top and bottom layers of identical weight and thickness, said method comprising
   splitting an initial supply of cellulose material into two parts, one for each of said top and bottom layers;
   supplying one of said parts to a first forming machine and the other of said parts to a second forming machine positioned downstream of said first forming machine;
   said first forming machine spreading a first amount of said cellulose material on a moving conveyor at a rate in excess of that necessary to form said bottom layer of said board on said conveyor;
   said second forming machine spreading a second amount of said cellulose material downstream of said first forming machine at a rate in excess of that necessary to form said top layer of said cellulose board;
   said core layer being spread by at least one core layer forming machine positioned intermediate said first and second forming machines, said core layer being spread at a rate in excess of that necessary to form said core layer; and
   removing the excess material spread by said first and second forming machines and by said core layer forming machine by first and second scalping means positioned downstream of and adjacent said first and second forming machines, respectively, to insure uniform thickness of said first and second layers, and by core layer scalping means positioned downstream of and adjacent said core layer forming machine to insure uniform thickness of said core layer;
   the improvement comprising:
      returning said excess material removed by said first scalping means to the supply for said second forming machine and said excess material removed by said second scalping means to the supply for said first forming machine,
      wherein the total supply of cellulose material to each of said first and second forming machines remains substantially constant notwithstanding variations in the amounts of cellulose material supplied to each of said first and second forming machines caused by unequal splitting of the initial supply thereto.

UNITED STATES PATENT OFFICE
CERTIFICATE OF CORRECTION

Patent No. 3,632,371                    Dated  January 4, 1972

Inventor(s)  BOHUSLAV E. MIKULKA

It is certified that error appears in the above-identified patent and that said Letters Patent are hereby corrected as shown below:

Column 3, at line 25, should read

Similarly,

Total feed rate into forming machine 12 = (a/2 - b) + (c + b)

Signed and sealed this 6th day of June 1972.

(SEAL)
Attest:

EDWARD M. FLETCHER, JR.            ROBERT GOTTSCHALK
Attesting Officer                  Commissioner of Patents